United States Patent
Wimmer et al.

(10) Patent No.: US 10,776,161 B2
(45) Date of Patent: Sep. 15, 2020

(54) APPLICATION CODE CALLBACKS AT REGULAR INTERVALS

(71) Applicant: Oracle International Corporation, Redwood Shores, CA (US)

(72) Inventors: Christian Wimmer, Belmont, CA (US); Peter Hofer, Linz (AT)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/206,710

(22) Filed: Nov. 30, 2018

(65) Prior Publication Data
US 2020/0174826 A1 Jun. 4, 2020

(51) Int. Cl.
*G06F 9/48* (2006.01)
*G06F 9/50* (2006.01)
(Continued)

(52) U.S. Cl.
CPC .............. *G06F 9/4887* (2013.01); *G06F 9/48* (2013.01); *G06F 9/485* (2013.01); *G06F 9/4806* (2013.01); *G06F 9/4825* (2013.01); *G06F 9/4837* (2013.01); *G06F 9/4843* (2013.01); *G06F 9/4881* (2013.01); *G06F 9/50* (2013.01); *G06F 9/5005* (2013.01); *G06F 9/5011* (2013.01); *G06F 9/52* (2013.01); *G06F 9/54* (2013.01)

(58) Field of Classification Search
CPC ........ G06F 9/48; G06F 9/4806; G06F 9/4825; G06F 9/4837; G06F 9/4843; G06F 9/485; G06F 9/4881; G06F 9/4887; G06F 9/50; G06F 9/5005; G06F 9/5011; G06F 9/52; G06F 9/54
See application file for complete search history.

(56) References Cited

U.S. PATENT DOCUMENTS

| 6,523,059 B1 | 2/2003 | Schmidt |
| 7,086,053 B2 | 8/2006 | Long et al. |

(Continued)

OTHER PUBLICATIONS

Yi Lin et al., "Stop and Go: Understanding Yieldpoint Behavior"; ISMM '15; Portland, Oregon; Jun. 14, 2015 (11 pages).
(Continued)

*Primary Examiner* — Charles M Swift
(74) *Attorney, Agent, or Firm* — Ferguson Braswell Fraser Kubasta PC

(57) ABSTRACT

A method may include obtaining, for a thread executing application code, a recurring task, a recurring interval, a previous callback time, a starting counter value, and a counter trigger, initializing a current counter value to the starting counter value, and performing checks in response to adjustments to the current counter value. Each check may determine whether the respective adjusted current counter value satisfies the counter trigger. The method may further include in response to a check determining that the adjusted current counter value satisfies the counter trigger, invoking a callback handler with a callback that performs the recurring task, and in response to an elapsed time exceeding the recurring interval, executing, by the callback handler, the callback. The elapsed time may be an amount of time elapsed between the previous callback time and the first invocation. The method may further include modifying the starting counter value using the elapsed time.

20 Claims, 5 Drawing Sheets

(51) Int. Cl.
G06F 9/54 (2006.01)
G06F 9/52 (2006.01)

(56) References Cited

U.S. PATENT DOCUMENTS

| | | |
|---|---|---|
| 7,103,877 B1 | 9/2006 | Arnold et al. |
| 8,429,658 B2 | 4/2013 | Auerbach et al. |
| 9,880,931 B2 | 1/2018 | Seaton et al. |
| 2005/0028160 A1* | 2/2005 | Cofer .................... G06F 9/4881 718/100 |
| 2007/0074219 A1* | 3/2007 | Ginsberg ................ G06F 1/329 718/102 |
| 2009/0276763 A1* | 11/2009 | Gulwani ............. G06F 9/44589 717/130 |
| 2010/0153776 A1 | 6/2010 | Vick et al. |
| 2013/0055276 A1* | 2/2013 | Park ..................... G06F 9/4887 718/103 |
| 2017/0161114 A1* | 6/2017 | Benton ................. G06F 9/4881 |
| 2019/0258510 A1* | 8/2019 | Hastings ............... G06F 9/4881 |

OTHER PUBLICATIONS

Matthew Arnold, "Online Profiling and Feedback-Directed Optimization of Java"; Dissertation; New Brunswick, New Jersey; Oct. 2002 (132 pages).

* cited by examiner

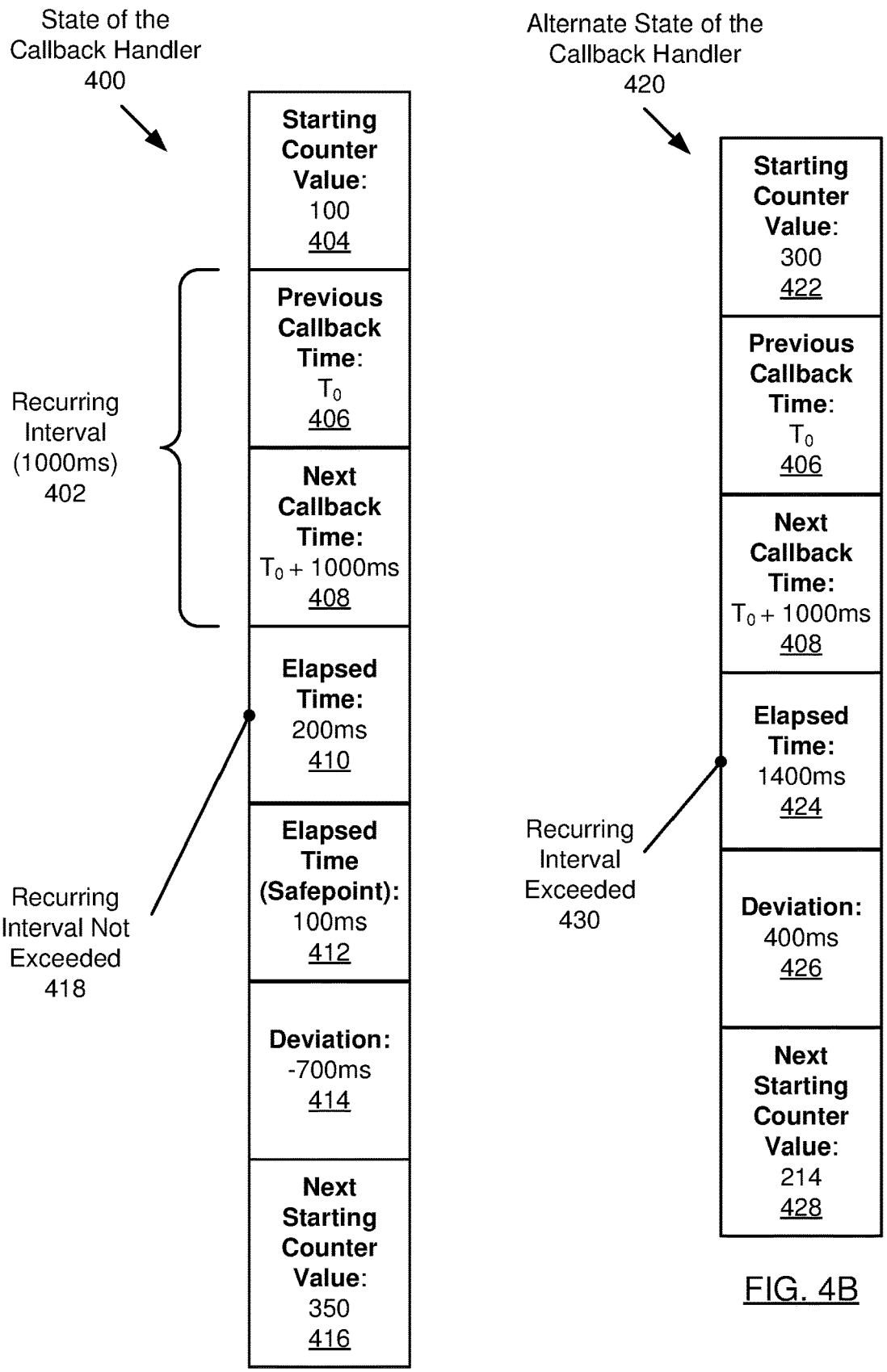

APPLICATION CODE CALLBACKS AT REGULAR INTERVALS

BACKGROUND

Applications have many tasks that need to be performed at regular intervals, such as checking whether a user has requested the cancellation of an operation. A typical solution is to start a helper thread that sleeps most of the time, but wakes up at regular intervals, checks whether a task is pending, executes the task, and then returns to sleep. However, this solution requires considerable operating system and central processing unit (CPU) resources because a thread needs to be created and regularly scheduled by the operating system. When starting a separate thread is not possible or feasible (e.g., due to single-threaded execution resulting from hardware or software restrictions), checks are often introduced directly into the application code, adversely affecting maintainability and reliability.

Virtual machines (VMs) use the "safepoint" (sometimes also called "yieldpoint") mechanism to interrupt application code when VM code (e.g., garbage collection) needs to run. One way to implement safepoints is to check a thread-local flag at every method return and/or loop iteration. However, this implementation does not help with tasks that need to be performed at regular intervals, since a thread stops instantly (i.e., not periodically) when a safepoint is requested, and a safepoint needs to be requested from a different thread.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including obtaining, for a thread executing application code, a recurring task, a recurring interval, a previous callback time, a starting counter value, and a counter trigger, initializing a current counter value to the starting counter value, and performing checks in response to adjustments to the current counter value. Each check determines whether the respective adjusted current counter value satisfies the counter trigger. The method further includes in response to a check determining that the adjusted current counter value satisfies the counter trigger, performing an invocation of a callback handler with a callback that performs the recurring task, and in response to an elapsed time exceeding the recurring interval, executing, by the callback handler, the callback. The elapsed time is an amount of time elapsed between the previous callback time and the first invocation. The method further includes modifying the starting counter value using the elapsed time.

In general, in one aspect, one or more embodiments relate to a system including a memory coupled to a computer processor, a repository configured to store application code, a host application, and a thread, executing the application code on the computer processor and using the memory, configured to obtain a recurring task, a recurring interval, a previous callback time, a starting counter value, and a counter trigger, initialize a current counter value to the starting counter value, and perform checks in response to adjustments to the current counter value. Each check determines whether the respective adjusted current counter value satisfies the counter trigger. The thread is further configured to in response to a check determining that the adjusted current counter value satisfies the counter trigger, perform an invocation of a callback handler with a callback that performs the recurring task. The system further includes the callback handler, executing on the computer processor and using the memory, configured to in response to an elapsed time exceeding the recurring interval, execute the callback. The elapsed time is an amount of time elapsed between the previous callback time and the first invocation. The callback handler is further configured to modify the starting counter value using the elapsed time.

In general, in one aspect, one or more embodiments relate to a non-transitory computer readable medium including instructions that, when executed by a processor, perform: obtaining, for a thread executing application code, a recurring task, a recurring interval, a previous callback time, a starting counter value, and a counter trigger, initializing a current counter value to the starting counter value, and performing checks in response to adjustments to the current counter value. Each check determines whether the respective adjusted current counter value satisfies the counter trigger. The instructions further perform: in response to a check determining that the adjusted current counter value satisfies the counter trigger, performing an invocation of a callback handler with a callback that performs the recurring task, and in response to an elapsed time exceeding the recurring interval, executing, by the callback handler, the callback. The elapsed time is an amount of time elapsed between the previous callback time and the first invocation. The instructions further perform modifying the starting counter value using the elapsed time.

Other aspects of the invention will be apparent from the following description and the appended claims.

BRIEF DESCRIPTION OF DRAWINGS

FIG. 4A and FIG. 4B show examples in accordance with one or more embodiments of the invention.

DETAILED DESCRIPTION

Figure 1:
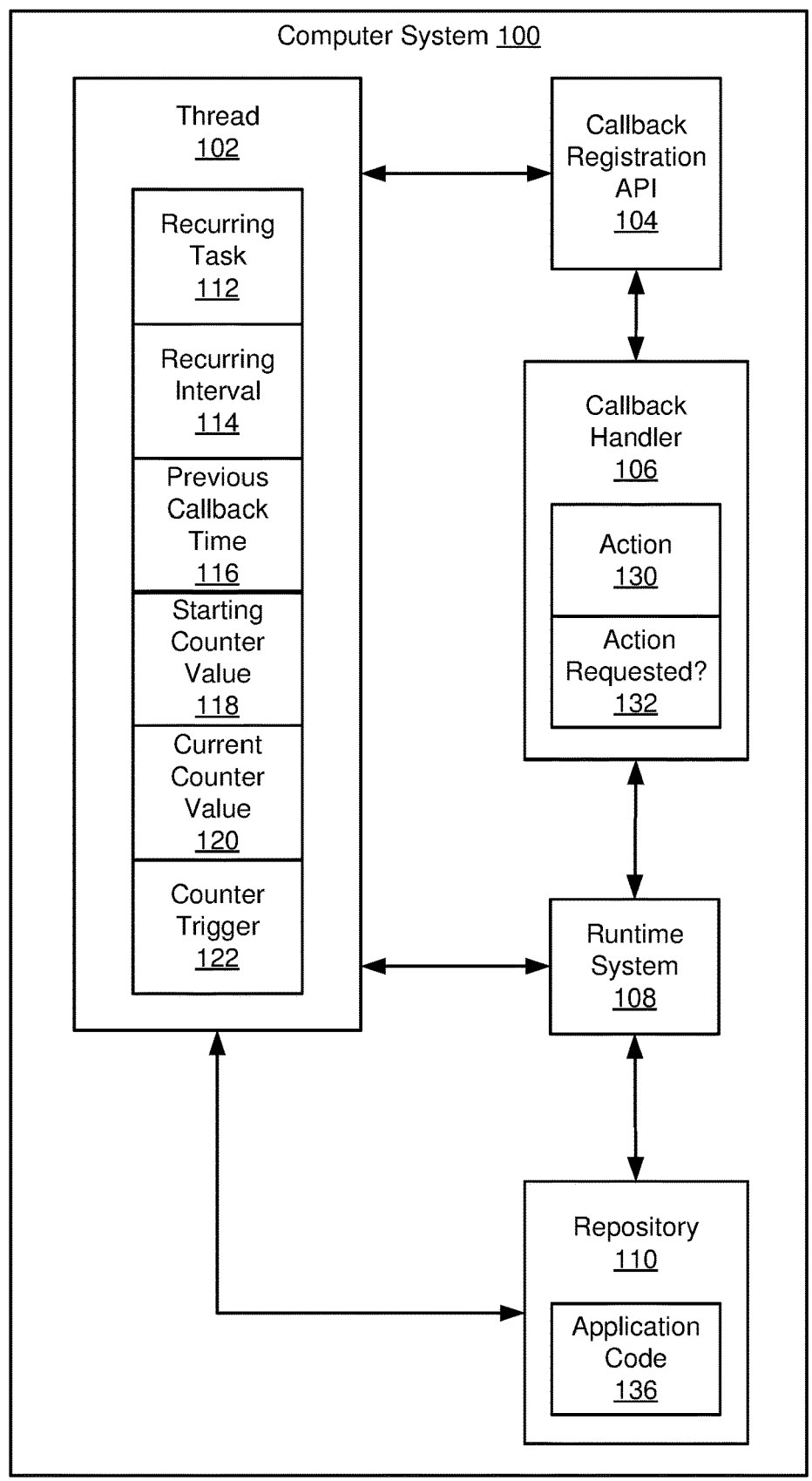
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a method, system, and computer-readable medium for managing application code callbacks at recurring intervals. In one or more embodiments, the elapsing of a recurring interval is approximated by performing a series of adjustments to a thread-local counter. For example, a series of adjustments that count down from a starting counter value to zero may efficiently approximate the recurring interval, and thus avoid the overhead of frequent requests for a current time from a system clock. In one or more embodiments, the adjustments are performed in response to specific types of events (e.g., procedure returns and/or completing loop iterations). In one or more embodiments, a check is performed after each adjustment to determine whether a counter trigger is satisfied (e.g., when the current counter value equals zero). In one or more embodiments, as a performance optimization, the adjustments are performed by an extended safepoint mechanism (e.g., since safepoint mechanisms perform checks in response to similar types of events).

When the counter trigger is satisfied, a callback to a recurring task may be invoked. The recurring task may be any application-level task (e.g., checking for a cancellation event initiated by a user). The recurring task may be executed if the elapsed time exceeds the recurring interval. A feedback mechanism may be used to modify the starting counter value so that future elapsed times may more accurately approximate the recurring interval.

FIG. 1 shows a computer system (100) in accordance with one or more embodiments of the invention. In one or more embodiments, the computer system (100) takes the form of the computing system (500) described with respect to FIG. 5A and the accompanying description below, or takes the form of the client device (526) described with respect to FIG. 5B.

In one or more embodiments, the computer system (100) includes a thread (102), a callback registration application programming interface (API) (104), a callback handler (106), a runtime system (108), and a repository (110).

In one or more embodiments, a thread (102) is the basic unit to which the runtime system (108) (e.g., an operating system of the runtime system (108)) allocates processor time. In one or more embodiments, there is a single thread executing in the computer system (100). Alternatively, multiple threads may be executing in the computer system (100). Each thread (102) may execute any part of the application code (136), including parts executed by another thread. In one or more embodiments, a thread (102) includes a recurring task (112), a recurring interval (114), a previous callback time (116), a starting counter value (118), a current counter value (120), and a counter trigger (122). The recurring task (112), recurring interval (114), previous callback time (116), starting counter value (118), current counter value (120), and counter trigger (122) may be stored in a memory region of the computer system (100) that is local to the thread (102).

In one or more embodiments, the recurring task (112) may be executable code, such as a function or a procedure (e.g., an executable portion of the application code (136)). For example, the recurring task (112) may check for the cancellation of a database query or a database session of a database system. A thread (102) may include multiple recurring tasks. In one or more embodiments, when the runtime system (108) supports multiple threads (102), the multiple recurring tasks may be executed in parallel in different threads.

In one or more embodiments, the recurring interval (114) is a specified amount of time between executions of the recurring task (112). For example, if the recurring interval (114) is 100 milliseconds, then the recurring task (112) may be executed every 100 milliseconds. In one or more embodiments, the previous callback time (116) is a point in time at which the recurring task (112) was previously executed. For example, the previous callback time (116) may be when the callback handler (106) previously executed the recurring task (112) via a callback.

In one or more embodiments, the starting counter value (118) is the initial value of a counter used by a thread (102) to approximate the passage of time. That is, the counter may be used as a proxy to approximate the passage of time without incurring the overhead of requesting the time from the runtime system (108). In one or more embodiments, the starting counter value (118) represents the number of adjustments to the current counter value (120) that approximate the length of the recurring interval (114). For example, a starting counter value of 100 may roughly correspond to a recurring interval of 300 milliseconds. The current counter value (120) may indicate the current value of the counter.

In one or more embodiments, the counter trigger (122) is a predicate applied to the current counter value (120). For example, the counter trigger (122) may check whether the current counter value (120) has reached a target value, such as zero.

In one or more embodiments, the callback handler (106) may be implemented in hardware, software, firmware, and/or any combination thereof. In one or more embodiments, the callback handler (106) includes functionality to execute an action (130). In one or more embodiments, the action (130) may be executable code, such as a function or a procedure (e.g., an executable portion of the application code (136)).

For example, the action (130) may be a safepoint. The safepoint may include a frequently executed check performed by the runtime system (108) to determine whether a thread (102) should be suspended. For example, the safepoint may be initiated prior to the runtime system (108) performing garbage collection. Alternatively, the action (130) may be any action performed by the runtime system (108). In one or more embodiments, the action requested? (132) flag indicates whether the action (130) has been requested. For example, the action (130) may have been requested by the runtime system (108) or by another thread.

In one or more embodiments, the callback handler (106) includes functionality to track the time at which a callback was last executed. The callback handler (106) may include functionality to modify the starting counter value (118) via a feedback mechanism based on how much of the recurring interval (114) has elapsed since the previous callback time (116).

In one or more embodiments, the callback registration API (104) may be implemented in hardware, software, firmware, and/or any combination thereof. In one or more embodiments, the callback registration API (104) includes functionality to register, for an executing thread (102), a callback with the callback handler (106) to be executed at a recurring interval (114). For example, the callback may be the recurring task (112).

In one or more embodiments, the runtime system (108) may be implemented in hardware (e.g., circuitry), software, firmware, and/or any combination thereof. In one or more embodiments, the runtime system (108) is a virtual machine.

A virtual machine is a software implementation of a computing device executing on an underlying computing device (e.g., computer system (100)). A virtual machine may abstract the operating system and hardware of the underlying computing device from instructions that are executed in the virtual machine.

In one or more embodiments, the runtime system (108) includes functionality to create one or more threads (102). In one or more embodiments, the runtime system (108) includes functionality to implement an action (130), such as a safepoint mechanism. The runtime system may include functionality to obtain the time from a system clock of the computer system (100).

In one or more embodiments, the repository (110) may be any type of storage unit and/or device (e.g., a file system, database, collection of tables, or any other storage mechanism) for storing data. Further, the repository (110) may include multiple different storage units and/or devices. The multiple different storage units and/or devices may or may not be of the same type or located at the same physical site.

In one or more embodiments, the repository (110) includes application code (136). In one or more embodiments, the application code (136) is a collection of source code including various software components. The application code (136) may include a collection of computer instructions written in a programming language, or intermediate representation (e.g., byte code).

While FIG. 1 shows a configuration of components, other configurations may be used without departing from the scope of the invention. For example, various components may be combined to create a single component. As another example, the functionality performed by a single component may be performed by two or more components.

Figure 2:
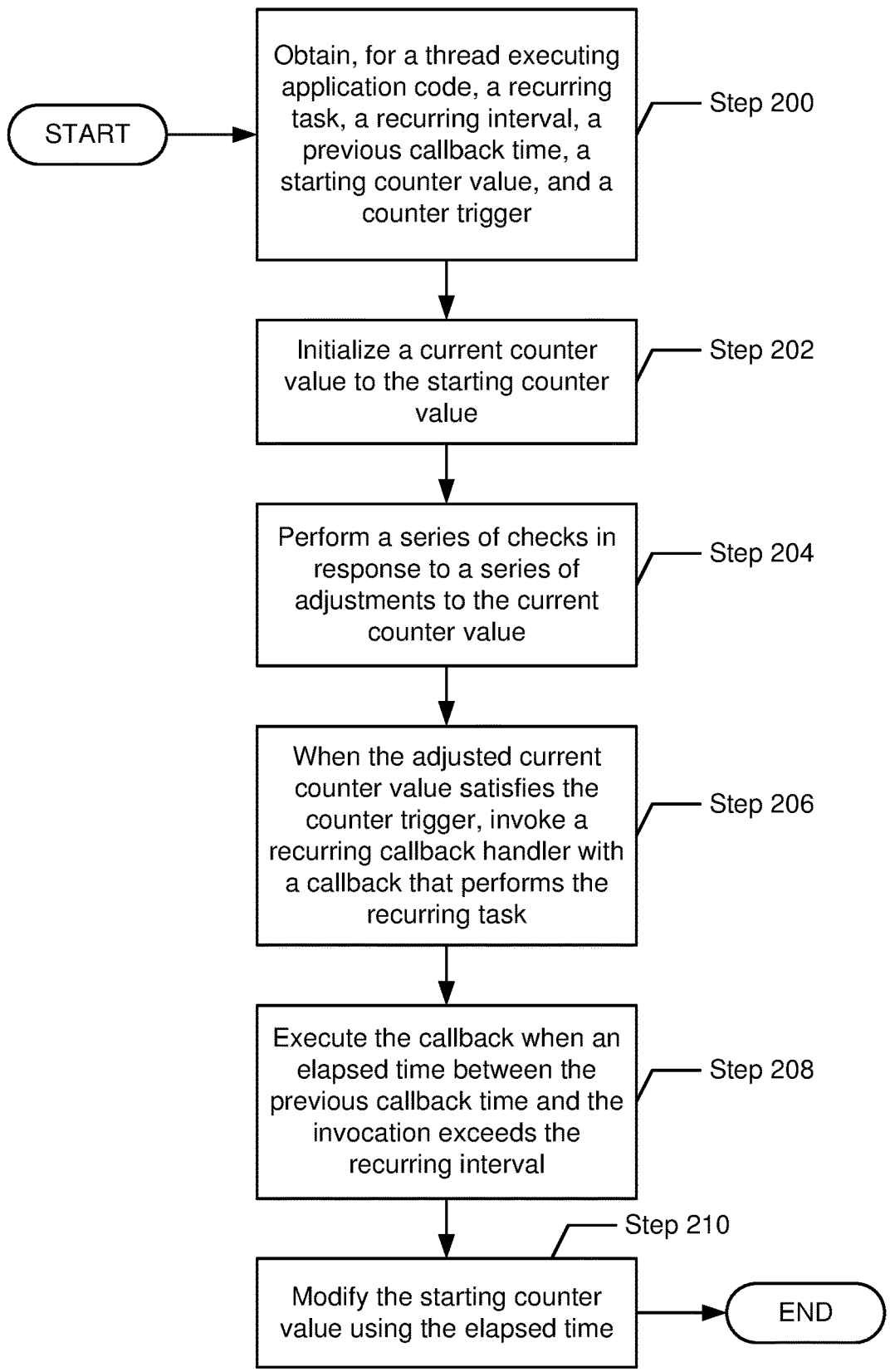
FIG. 2 and FIG. 3 show flowcharts in accordance with one or more embodiments of the invention.

FIG. 2 shows a flowchart in accordance with one or more embodiments of the invention. The flowchart depicts a process for managing application code callbacks at recurring intervals. One or more of the steps in FIG. 2 may be performed by the components (e.g., the thread (102), the callback handler (106) and/or the runtime system (108) of the computer system (100)), discussed above in reference to FIG. 1. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, a recurring task, a recurring interval, a previous callback time, a starting counter value, and a counter trigger are obtained for a thread executing application code. The recurring task and the recurring interval may be set by the application code. The previous callback time may represent the starting point of the recurring interval. In one or more embodiments, the previous callback time may be a time (e.g., a timestamp) obtained from the runtime system. For example, the thread may obtain the time from the runtime system (e.g., using a system clock of the computer system). The previous callback time and/or the starting counter value may be set to default values, for example, if the recurring task has not yet been executed.

In one or more embodiments, the thread registers, using the callback registration application programming interface (API), the recurring task as a callback with the callback handler. The thread may also register the recurring interval with the callback handler. For example, different threads may use the callback registration API to register, with the callback handler, different recurring tasks to be executed at different recurring intervals. In one or more embodiments, the thread may also provide an initial counter starting value when registering the recurring task with the callback handler.

In Step 202, a current counter value is initialized to the starting counter value. In one or more embodiments, the current counter value may be stored in a memory region that includes values local to the thread. To improve performance, the runtime system may store a pointer to the memory region in a register of the computer system. A fixed offset may indicate the location of the current counter value within the memory region.

In Step 204, a series of checks is performed in response to a series of adjustments to the current counter value. In one or more embodiments, the current counter value is adjusted (e.g., "ticked") in response to specific types of events. For example, the event may be a method or procedure return or the completion of a loop iteration. In one or more embodiments, the adjustments to the current counter value are uniform. In other words, each adjustment may adjust the current counter value by the same amount. For example, each adjustment may increment the current counter value by the same amount. Alternatively, each adjustment may decrement the current counter value by the same amount. Still alternatively, the adjustments to the current counter value may be non-uniform, such that the amount of each adjustment may vary.

Each check may determine whether the respective adjusted current counter value satisfies the counter trigger. For example, the check may be performed by an instruction that compares the adjusted current counter value to a target value specified by the counter trigger. Continuing this example, if the target value is zero, then, in many computer systems, the check may be performed efficiently by an assembly code instruction that compares a value to zero, and performs a jump (e.g., to the callback handler) when the value equals zero.

Performing the checks incurs a very low overhead when the runtime system already provides a safepoint mechanism. For example, a very minor overhead is added by changing the traditional safepoint check from checking a Boolean flag, which incurs a memory read, to a counter decrement, which incurs a memory read, a simple arithmetic operation, and a memory write, without using any additional operational system resources (e.g., threads). The performance of the computer system may be significantly improved when the check is performed efficiently, since the check may be performed millions of times per second. For example, studies have shown that approximately 2% of total CPU time is spent on similar instructions used to check a Boolean value to determine whether to initiate a safepoint.

In Step 206, in response to a check determining that the adjusted current counter value satisfies the counter trigger, the callback handler is invoked with a callback that performs the recurring task. In one or more embodiments, the thread has already registered the recurring task as a callback with the callback handler, as described in Step 200 above. The satisfaction of the counter trigger by the adjusted current counter value may suggest that an amount of time equivalent to the recurring interval may have elapsed since the last callback time. In other words, the time elapsed while performing the series of adjustments to the current counter value may be a good approximation of the recurring interval.

In Step 208, in response to an elapsed time exceeding the recurring interval, the callback is executed by the callback handler. That is, the callback handler may invoke the callback upon validating that the recurring interval has been exceeded by the elapsed time. The elapsed time may be an amount of time elapsed between the previous callback time and an invocation time. The invocation time may be defined as the point in time when the callback handler is invoked by the thread.

The callback may be delayed in situations where there are no counter adjustments and checks, which may cause the recurring interval to be exceeded by a significant amount. Examples of such situations may include: when the thread is waiting for a lock, executing native code, or is not scheduled by the operating system of the computer system.

In one or more embodiments, the callback handler may be temporarily disabled (e.g., by the runtime system) while the application code requires synchronization with another thread. Similarly, the callback handler may be temporarily disabled while a critical section of the application code is being executed.

In Step 210, the starting counter value is modified using the elapsed time. The callback handler may use a feedback mechanism to modify the starting counter value so that future elapsed times may more accurately approximate the recurring interval. In one or more embodiments, the starting counter value is decreased based on the amount by which the elapsed time exceeds the recurring interval. For example, decreasing the starting counter value decreases the number of adjustments of the counter current value (e.g., during a future execution of Step 204 above). In one or more embodiments, the starting counter value is modified when the elapsed time exceeds the recurring interval by at least a predetermined threshold amount of time.

Figure 3:
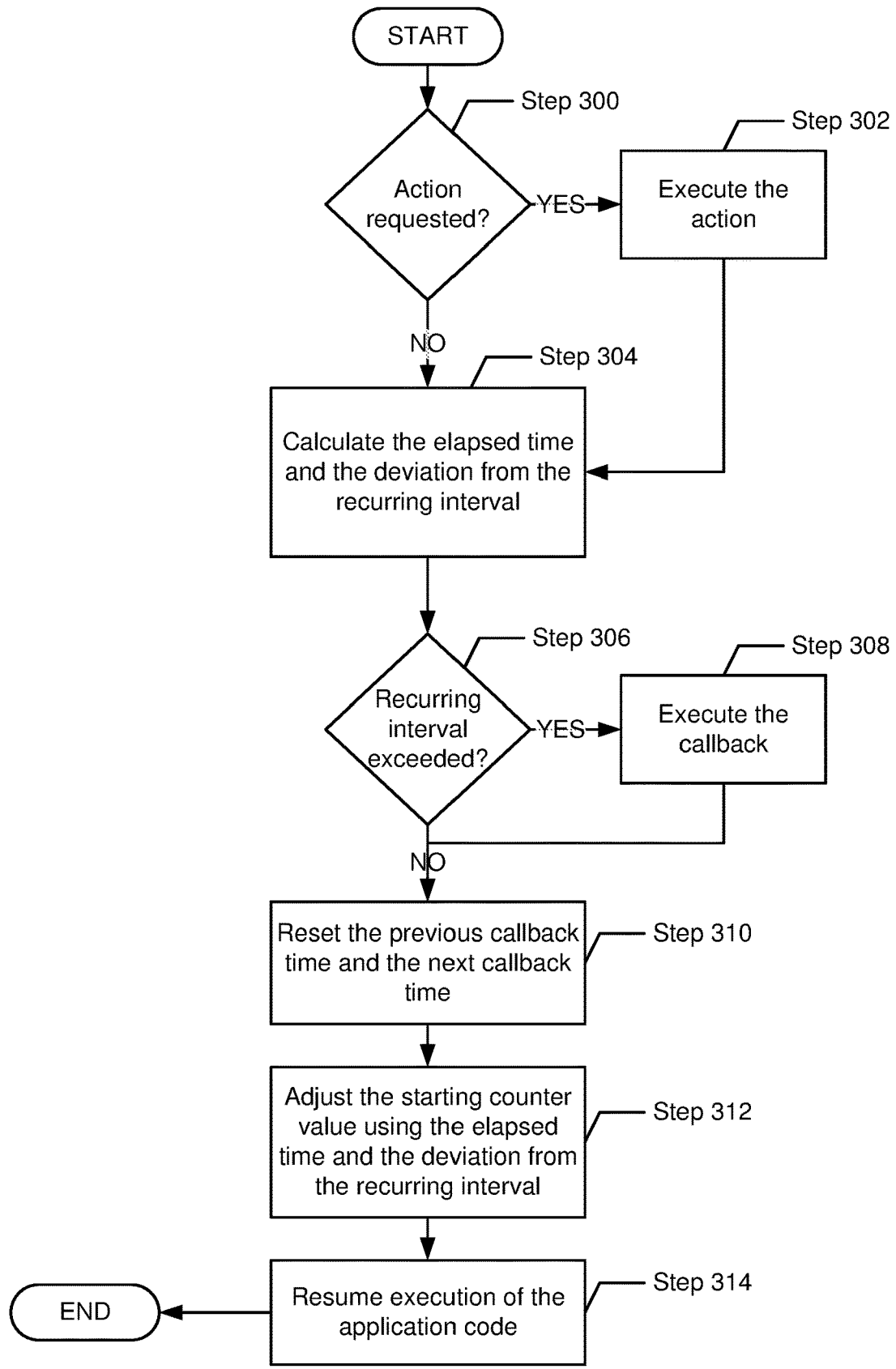

FIG. 3 shows a flowchart in accordance with one or more embodiments of the invention. The flowchart depicts a process for managing application code callbacks at recurring intervals. One or more of the steps in FIG. 3 may be performed by the components (e.g., the thread (102), the callback handler (106) and/or the runtime system (108) of the computer system (100)), discussed above in reference to FIG. 1. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, if, in Step 300, it is determined that an action has been requested, then in Step 302, the action is executed, and Step 304 below is performed. The callback handler may determine that the action has been requested by examining the value of the action requested? flag. Otherwise, if Step 300 determines that the action has not been requested, then Step 304 below is performed.

In one or more embodiments, the callback handler stores the invocation time. The callback handler may calculate the next callback time as the previous callback time plus the recurring interval.

The action may be a safepoint. In one or more embodiments, when the action is requested, the current counter value is reset to a value that accelerates the satisfaction of the counter trigger. For example, if the counter trigger checks whether the current counter value has reached a target value of zero, and each adjustment to the current counter value decrements the current counter value by 1, then resetting the current counter value to 1 causes the counter trigger to be satisfied on the next adjustment (e.g., decrement) to the current counter value. Thus, the counter trigger may be satisfied under two different scenarios:

Scenario 1: a series of adjustments to the current counter value (e.g., during the execution of Step 204 above) that approximate the passage of time during the recurring interval.

Scenario 2: an explicit resetting of the current counter value (e.g., when requesting that an action be performed) to accelerate the satisfaction of the counter trigger.

In one or more embodiments, when the action is a safepoint, then as a performance optimization, an existing safepoint implementation may be extended to incorporate both scenarios above, using the processes described in FIG. 2 and FIG. 3.

In Step 304, the elapsed time and the deviation from the recurring interval are calculated. In one or more embodiments, the elapsed time is an amount of time elapsed between the previous callback time and the invocation time (see description of Step 208 above). Thus, the elapsed time excludes any time elapsed subsequent to the invocation time. For example, the elapsed time excludes any time elapsed due to executing the action in Step 302 above.

In one or more embodiments, the callback handler requests the current time from the runtime system. Note that if the action was executed in Step 302 above, then the current time may be significantly later than the invocation time, due to the time elapsed while executing the action. The callback handler may calculate the deviation from the recurring interval as the difference between the current time and the next callback time. In one or more embodiments, the deviation from the recurring interval excludes any time elapsed due to executing the action in Step 302 above.

If, in Step 306, it is determined that the elapsed time exceeds the recurring interval, then in Step 308, the callback is executed (see description of Step 208 above), and Step 310 below is performed. Otherwise, if Step 306 determines that the elapsed time does not exceed the recurring interval, then Step 310 below is performed.

In Step 310, the previous callback time and the next callback time are reset. In one or more embodiments, the callback handler resets the previous callback time to the current time, and resets the next callback time to the current time plus the recurring interval. In other words, the current time may be used as the starting point for the next recurring interval.

In Step 312, the starting counter value is modified using the elapsed time and the deviation from the recurring interval (see description of Step 210 above). In one or more embodiments, the modified starting counter value is proportional to the deviation and/or inversely proportional to the elapsed time. For example, the callback handler may calculate the modified starting counter value by multiplying the deviation by a scaling factor. Alternatively, the modified starting counter value may be obtained by subtracting, from the starting counter value, the result of multiplying the deviation by the scaling factor (e.g., if the result differs from the starting counter value by more than a predetermined threshold).

In one or more embodiments, the scaling factor is inversely proportional to the elapsed time. For example, the scaling factor may be the previous starting counter value divided by the elapsed time. The scaling factor, and thus the modified starting counter value, may be smaller when the elapsed time is larger. In one or more embodiments, the scaling factor is calculated based on an average of previous values of the scaling factor. For example, the average may be a moving average (e.g., an exponential weighted moving average, or EWMA).

When the modified starting counter value is smaller, there may be fewer adjustments to the current counter value, once execution of the application code is resumed in Step 314 below.

Note that under Scenario 2 (see description of Step 300, Step 302, and Step 304 above), when the current counter value is explicitly reset to accelerate the satisfaction of the counter trigger, the elapsed time may be significantly less than the recurring interval.

In Step 314, execution of the application code is resumed by the thread, by executing the process described in FIG. 2 (e.g., beginning with Step 204 above), using the modified starting counter value.

The following example is for explanatory purposes only and not intended to limit the scope of the invention. FIG. 4A and FIG. 4B show an implementation example in accordance with one or more embodiments of the invention. FIG. 4A shows a state of the callback handler (400) that includes values of various parameters. The callback handler ((106) in FIG. 1) is invoked by a thread ((102) in FIG. 1) that executes application code ((136) in FIG. 1) of a database management system.

Initially, the thread registers a recurring task ((112) in FIG. 1) as a callback with the callback handler via a callback registration API ((104) in FIG. 1). In this example, the recurring task checks whether a user has canceled a database query (e.g., by pressing control-C). The thread also provides a recurring interval (402) ((114) in FIG. 1) of 1000 milliseconds to the callback handler via the callback registration API. The callback handler initializes the starting counter value (404) ((118) in FIG. 1) to a default value of 100. The counter trigger ((122) in FIG. 1) is satisfied when the current counter value ((120) in FIG. 1) is zero. The callback handler also initializes the previous callback time (406) ((116) in FIG. 1) to the current system time, indicated by $T_0$, and initializes the next callback time (408) to the previous callback time (406) plus the recurring interval (402), indicated by $T_0$+1000 milliseconds.

The thread initializes the current counter value to the starting counter value (404) of 100, and performs a series of decrements to the current counter value. After each decrement, the thread checks whether the counter trigger is satisfied, in this case, whether the current counter value is equal to zero.

Long before the recurring interval (402) is reached, a safepoint is requested, and the current counter value is reset to 1. On the following decrement, the current counter value reaches zero, thus satisfying the counter trigger, and causing the invocation of the callback handler with the callback that performs the recurring task (i.e., checking for the query cancellation). When the callback handler is invoked, the elapsed time (410) is 200 milliseconds. In other words, the invocation of the callback handler occurs 200 milliseconds after the previous callback time (406).

Upon invocation, the callback handler checks whether a safepoint has been requested, for example, by checking the value of the action requested? flag. In this case, a safepoint has been requested, and the callback handler executes the safepoint, resulting in additional elapsed time due to the safepoint (412) of 100 milliseconds. The callback handler then calculates the deviation (414) at −700 milliseconds, by subtracting the recurring interval (402) from the elapsed time (410) plus the additional elapsed time due to the safepoint (412). Thus, the deviation (414) is the remaining time, relative to the current time, until the next callback time (408).

The callback handler determines that the elapsed time (410) has not exceeded (418) the recurring interval (402) of 1000 milliseconds. Thus, the callback of the recurring task is not executed.

The callback handler then resets the previous callback time (406) to be the current time, and resets the next callback time (408) to be the current time plus the recurring interval (402).

The callback handler next modifies the starting counter value (404) using the elapsed time (410) and the deviation (414). Since the elapsed time (410) was less than the recurring interval (402), the callback handler modifies the starting counter value (404) by calculating a next starting counter value (416) of 350. For example, the deviation (414) of −700 milliseconds may be scaled by a scaling factor of 0.5, and then converted to a positive value. The scaling factor is calculated by dividing the starting counter value (404) of 100 by the elapsed time (410) of 200 milliseconds.

FIG. 4B illustrates an alternate state of the callback handler (420). In FIG. 4B, the starting counter value (422) is set to value of 300. Since no safepoint is requested in the alternate scenario, the thread decrements the current counter value 300 times, eventually satisfying the counter trigger when the current counter value is equal to zero, causing the invocation of the callback handler with the callback that performs the recurring task. When the callback handler is invoked, the elapsed time (424) is 1400 milliseconds, which exceeds (430) the recurring interval (402). Thus, the callback handler executes the callback of the recurring task. The callback handler then calculates the deviation (426) from the recurring interval (402) at 400 milliseconds, which is the amount by which the elapsed time (424) exceeds the recurring interval (402) of 1000 milliseconds.

The callback handler modifies the starting counter value (422) by calculating a next starting counter value (428) of 214. For example, the deviation (426) of 400 milliseconds may be scaled by a scaling factor of 0.214, to obtain a result of 86. The scaling factor is calculated by dividing the starting counter value (422) of 300 by the elapsed time (424) of 1400 milliseconds. Since the result of multiplying the deviation (426) by the scaling factor is much less than the starting counter value (428), the result is subtracted from the starting counter value (422) of 300, to obtain the next starting counter value (428) of 214.

Figure 5A:
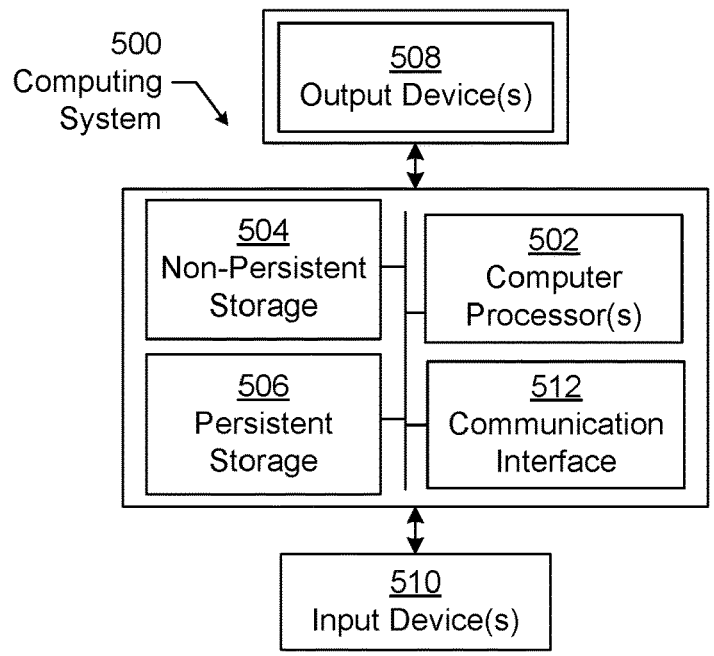
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
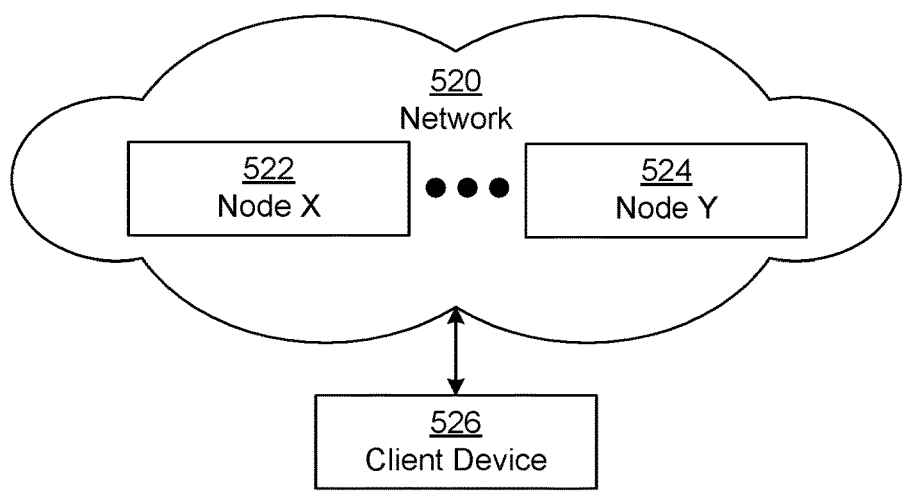

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
obtaining, for a thread executing application code, a recurring task, a recurring interval, a previous callback time, a starting counter value, and a counter trigger;
initializing a current counter value to the starting counter value;
performing a series of checks in response to a series of adjustments to the current counter value, wherein each check determines whether the respective adjusted current counter value satisfies the counter trigger;
in response to a first check of the series of checks determining that the adjusted current counter value satisfies the counter trigger, performing a first invocation of a callback handler with a callback that performs the recurring task;
in response to a first elapsed time exceeding the recurring interval, executing, by the callback handler, the callback, wherein the first elapsed time is an amount of time elapsed between the previous callback time and the first invocation; and
modifying the starting counter value using the first elapsed time.

2. The method of claim 1, further comprising:
in response to a second check of the series of checks determining that the adjusted current counter value satisfies the counter trigger, performing a second invocation of the callback handler with the callback; and
in response to a second elapsed time not exceeding the recurring interval, increasing the starting counter value using the second elapsed time, wherein the second elapsed time is an amount of time elapsed between the previous callback time and the second invocation,
wherein modifying the starting counter value using the first elapsed time comprises decreasing the starting counter value.

3. The method of claim 1, further comprising:
registering the callback with the callback handler using an application programming interface (API).

4. The method of claim 1, further comprising:
determining whether an action has been requested;
in response to determining that the action has been requested, executing the action; and
excluding, from the first elapsed time, a second elapsed time due to executing the action.

5. The method of claim 1, further comprising:
calculating a deviation from the recurring interval as the difference between a current time and a next callback time,
wherein the next callback time is the previous callback time plus the recurring interval, and
wherein the modification to the starting counter value is proportional to the deviation and inversely proportional to the first elapsed time.

6. The method of claim 5, further comprising:
calculating a current value of a scaling factor by dividing the starting counter value by the first elapsed time,
wherein the current value of the scaling factor is based on an average of previous values of the scaling factor, and
wherein the modification to the starting counter value is the product of multiplying the deviation by the current value of the scaling factor.

7. The method of claim 1, further comprising:
storing the current counter value in a register of a computer system, wherein the thread executes in the computer system.

8. The method of claim 1, further comprising:
disabling the callback handler while the application code requires synchronization with another thread.

9. A system, comprising:
a memory coupled to a computer processor;
a repository configured to store application code;
a thread, executing the application code on the computer processor and using the memory, configured to:
obtain a recurring task, a recurring interval, a previous callback time, a starting counter value, and a counter trigger;
initialize a counter current value to the starting counter value;
perform a series of checks in response to a series of adjustments to the current counter value, wherein each check determines whether the respective adjusted current counter value satisfies the counter trigger; and
in response to a first check of the series of checks determining that the adjusted current counter value satisfies the counter trigger, perform a first invocation of a callback handler with a callback that performs the recurring task; and
the callback handler, executing on the computer processor and using the memory, configured to:
in response to a first elapsed time exceeding the recurring interval, execute the callback, wherein the first elapsed time is an amount of time elapsed between the previous callback time and the first invocation; and
modify the starting counter value using the first elapsed time.

10. The system of claim 9,
wherein modifying the starting counter value using the first elapsed time comprises decreasing the starting counter value,
wherein the thread is further configured to: in response to a second check of the series of checks determining that the adjusted current counter value satisfies the counter trigger, perform a second invocation of the callback handler with the callback, and
wherein the callback handler is further configured to: in response to a second elapsed time not exceeding the recurring interval, increase the starting counter value using the second elapsed time, wherein the second elapsed time is an amount of time elapsed between the previous callback time and the second invocation.

11. The system of claim 9, further comprising an application programming interface (API) configured to:
register, for the thread, the callback with the callback handler.

12. The system of claim 9, wherein the callback handler is further configured to:
determine whether an action has been requested;
in response to determining that the action has been requested, execute the action; and
exclude, from the first elapsed time, a second elapsed time due to executing the action.

13. The system of claim 9, wherein the callback handler is further configured to:
calculate a deviation from the recurring interval as the difference between a current time and a next callback time,
wherein the next callback time is the previous callback time plus the recurring interval, and
wherein the modification to the starting counter value is proportional to the deviation and inversely proportional to the first elapsed time.

14. The system of claim 13, wherein the callback handler is further configured to:
calculate a current value of a scaling factor by dividing the starting counter value by the first elapsed time,
wherein the current value of the scaling factor is based on an average of previous values of the scaling factor, and
wherein the modification to the starting counter value is the product of multiplying the deviation by the current value of the scaling factor.

15. The system of claim 9, wherein the thread is further configured to:
store the counter current value in a register of the computer processor.

16. A non-transitory computer readable medium comprising instructions that, when executed by a computer processor, perform:
obtaining, for a thread executing application code, a recurring task, a recurring interval, a previous callback time, a starting counter value, and a counter trigger;
initializing a current counter value to the starting counter value;
performing a series of checks in response to a series of adjustments to the current counter value, wherein each check determines whether the respective adjusted current counter value satisfies the counter trigger;
in response to a first check of the series of checks determining that the adjusted current counter value satisfies the counter trigger, performing a first invocation of a callback handler with a callback that performs the recurring task;
in response to a first elapsed time exceeding the recurring interval, executing, by the callback handler, the callback, wherein the first elapsed time is an amount of time elapsed between the previous callback time and the first invocation; and
modifying the starting counter value using the first elapsed time.

17. The non-transitory computer readable medium of claim 16, further comprising instructions that perform:
calculating a deviation from the recurring interval as the difference between a current time and a next callback time; and
calculating a current value of a scaling factor by dividing the starting counter value by the first elapsed time,
wherein the next callback time is the previous callback time plus the recurring interval,
wherein the modification to the starting counter value is proportional to the deviation and inversely proportional to the first elapsed time,
wherein the current value of the scaling factor is based on an average of previous values of the scaling factor, and
wherein the modification to the starting counter value is the product of multiplying the deviation by the current value of the scaling factor.

18. The non-transitory computer readable medium of claim 16, further comprising instructions that perform:
in response to a second check of the series of checks determining that the adjusted current counter value satisfies the counter trigger, performing a second invocation of the callback handler with the callback; and
in response to a second elapsed time not exceeding the recurring interval, increasing the starting counter value using the second elapsed time, wherein the second elapsed time is an amount of time elapsed between the previous callback time and the second invocation,
wherein modifying the starting counter value using the first elapsed time comprises decreasing the starting counter value.

19. The non-transitory computer readable medium of claim 16, further comprising instructions that perform:
registering the callback with the callback handler using an application programming interface (API).

20. The non-transitory computer readable medium of claim 16, further comprising instructions that perform:
determining whether an action has been requested;
in response to determining that the action has been requested, executing the action; and
excluding, from the first elapsed time, a second elapsed time due to executing the action.

* * * * *